Patented Oct. 28, 1941

2,260,910

UNITED STATES PATENT OFFICE 2,260,910

PROCESS FOR PURIFYING AND DECOLORIZING OILY AND FATTY MATERIALS

Eugene Kellens, Brussels, Belgium

No Drawing. Application December 28, 1936, Serial No. 117,971. In Germany January 2, 1936

12 Claims. (Cl. 260—420)

This invention is for improvements in or relating to processes for the purification and decolorization of oils and fats, in particular those of vegetable and animal origin, or fatty acids thereof, either alone or in admixture.

It is already known that the majority of oils and fats of dark color and in particular those with a naturally pronounced red color, such for example, as palm oil or bamboo oil, etc., can be bleached by direct or indirect oxidation. This process can be carried out by means of atmospheric oxygen or ozone or by means of bodies which develop oxygen or ozone, for example, peroxides, oxides, acids, chlorine and the like.

The process can also be carried out by the simple action of large quantities of activated bleaching earths. Finally the decolorization can also be attained by heating the oils, which heating can be raised to high temperatures, for examples 140° C. or higher. By prolonged treatment of the oils and the like at high temperature, however, the content in acid increases considerably.

In these known processes there are obtained, according to the origin and the quality of the products to be treated, the process used, and the quantity of decolorizing agent employed, very variable degrees of decolorization. This irregular decolorization is in general insufficient and in most cases, moreover, the decolorization is not stable. The color returns wholly or partly at the instant of saponification and gives soap which is more or less colored. In very rare cases only is the soap as free of color as the oil from which it was produced, when the decolorization was effected according to the hitherto known processes. Furthermore, the oxy-acid and fatty acid contents of the products treated according to these known oxidation processes (both when using air and also when using chemical substances) is considerably increased. With the known processes, moreover, the action of the treating substances is based almost entirely upon an oxidation and conversion of the coloring constituents into an intermediate product. The coloring constituent is neither removed nor destroyed in the known processes and in the course of the saponification it appears again in a more or less pronounced or altered form.

The object of the present invention is to provide an improved process for the purification and decolorization of oils and fats or fatty acids thereof, by which process the above-mentioned disadvantages and defects experienced with the known processes are avoided.

According to the invention, the process for the purification and decolorization of oils and fats, particularly those of vegetable and animal origin, or fatty acids thereof, either alone or in admixture, comprises drying and if necessary freeing from mechanical impurities, the oil, fat or fatty acid; suspending in it, at a temperature in the neighbourhood of its melting point, a metal, metal oxide or metal salt in sufficiently small quantity to avoid enriching the mass in respect of its fatty acid or oxy-acid content; stirring the suspension until there is formed between the metal, metal oxide or metal salt and the mucins, albuminoids, coloring matter and the like of the oil, fat or fatty acid, a colloidal complex recognizable by the cessation of change of color of the mass; adding to the latter at this stage, with continued stirring at substantially the same temperature, a small quantity of an acid, for example, sulphuric acid or nitric acid; raising the temperature of the mass to a temperature not exceeding 90° C.; and introducing into it at the elevated temperature and with continued stirring, an adsorbent substance, for example a used decolorizing agent; and filtering out of the purified and decolorized oil, fat or fatty acid the adsorbent substance.

It is found that by this process, the disadvantages and defects referred to above of the known processes are effectually avoided. Thus, the colorizing constituents of the oil, fat or fatty acid are completely removed therefrom in the process partly by destruction and partly by precipitation on to the adsorbent substance which, according to the process, is afterwards separated from the treated oil, fat or the like by filtration. Also, the process enables a permanent decolorization to be obtained by the use of an extremely small quantity of treating agent compared with the quantities hitherto used. Further, the decolorization obtained takes place in a regular manner and failure in the process is impossible.

By the new process, the coloring constituents of the oil, fat or fatty acid are in the first place removed, and in addition the albuminoids, mucins and all colloids which are in the oil, fat or fatty acid are also removed. The products obtained are in a condition which is particularly favorable for refining and for hydrogenation.

The acid content of the oil or fat remains practically unaltered. The percentage content in oxy and fatty acids is also practically unaltered.

The bleached oil or fat shows no redarkening in the course of saponification, nor do soaps which have been made from the treated oil or fat.

The process according to the invention may be carried out substantially as follows:

First, the water and the mechanical impurities are removed from the raw material in order to obtain a uniform initial substance. To the dried and purified substance there is added a small quantity of a treating agent consisting, as already indicated, of a suitable subdivided or pulverised metal, which is known to have a reducing action, for example, nickel, cobalt, zinc, manganese, copper, or a suitable metal oxide, for example, an oxide of cobalt, copper, manganese or nickel, the term "oxide" being used in this connection to include dioxides, for example, manganese dioxide, or a suitable metal salt, for example, manganates, permanganates, bichromates or chlorates of the above metals, which are known to have an oxidizing effect, or a body which is capable of developing such a metal, metal oxide or metal salt in situ in the mass, in such a manner that a more or less large proportion of the treating agent is in a colloidal state or at least is transformed into a condition of a true suspension.

According to the hitherto known processes, the decolorization consisted simply in a chromogen being converted into a leuco-derivative. The new process, however, is based upon the assumption that the coloring substance which is dissolved in palm oil, bamboo oil and the like forms an intimate compound with the atoms of metal salts and produces a complex, and that the colloidal action of the metals in suspension permits the replacement or the conversion of a portion of this complex. The action once commenced proceeds slowly and is accelerated by the addition of traces of acid, which proceed to act upon the complex, which is found even in the first state of the substitution. The complete destruction of the complex or the conversion thereof into a different form is thus rendered possible.

The compounds so produced, either destroyed or converted, are in such a condition that they are absorbed and adsorbed by a collecting substance, e. g., activated fuller's earth.

This phenomenon may be observed in entirely unpurified and non-uniform oils. It is not certain that the explanation given is absolutely correct, but experience appears, however, to prove its correctness. In any case, it is possible to carry out the process always with the same results.

In general, all oils, especially for example palm oil and bamboo oil, contain water and other impurities. In order to convert them into a uniform condition, these oils are previously dried and if necessary purified by heating under vacuum at a temperature which may vary according to the nature of the material and its content in moisture.

The oils, fats and the like, thus preliminarily purified, are cooled and kept at a temperature in the vicinity of the melting point. There are then added, for example from 0.1 to 0.5%, reckoned on the basis of the weight of the material to be treated, of an oxide of cobalt, copper, manganese, nickel or the like and this being preferably in a dry pulverised condition and in a very finely subdivided state. The addition preferably takes place in a device which permits the treating or reaction agents being kept in suspension in the mass, for example, in a stirring device.

This step of the process is continued for the necessary time, which, according to the material and the initial substance, varies from 1 to 5 hours. It should, in any case, be continued until a considerable proportion of the reaction agent is in a colloidal form, or at least in the condition of a suspension.

Although the oxides added to the fatty substance, do not exert any reaction on the fatty substance, a very appreciable change of color can be observed at the instant when the condition of suspension is reached. This clearly shows that the object of the first stage of the process has been attained.

At this moment, there is added to the mass, which is still kept in the vicinity of its melting point, gradually and preferably in a very finely subdivided condition, but always slowly, from 0.1 to 0.2%, reckoned by weight on the basis of the material under treatment, of sulphuric acid of 60–66° Bé. or hydrochloric acid, nitric acid or the like, in a concentration which is adapted to the state of purity, the quality and the origin of the oils or fats and the like under treatment. After the addition of this reaction acid, which takes place very slowly and in the same special device, the action is allowed to continue, the mass being stirred for 1, 2, 3 or 4 hours, according to the nature of the product, preferably in a device working under vacuum.

After these actions, which are carried out at a comparatively low temperature, the temperature is gradually raised to at most 90° C. There is then added 1 to 2% of fuller's earth residues and the mixture is stirred at the elevated temperature for about 30 minutes and then filtered.

During the entire treatment, the material is preferably maintained under vacuum. By the foregoing treatment a degree of decolorization is obtained which, for the majority of oils and fats, is very considerable. At this point, the principal object that is, the destruction and removal of the coloring constituents, has been largely attained.

However, if an absolute decolorization is desired, the treated product can be subjected according to known processes, to a subsequent treatment with activated fuller's earth. To this end, the oil obtained after filtration is, for example, heated under vacuum to about 90° C., after which there is added to it a variable quantity of activated fuller's earth which altogether does not amount to more than 2%.

This second operation can if necessary be complemented by a third and similar one. By the action of this fuller's earth, the effect of the first stage of the process is extraordinarily increased. The action of the 2% of activated fuller's earth greatly exceeds the effect which would be obtained by the addition of 10% of the same earth to an oil which had not been previously subjected to the process according to the invention.

The third stage of the process may be similar to the second. In the majority of cases, however, a third stage is not necessary. It simply depends on the desired degree of decolorization. Also, in this third stage the activated fuller's earth can be replaced by a mixture of activated earth and animal charcoal. The total quantity of treating agents during the third stage of the operation is in any case less than that used in the second stage.

The process according to the invention may be used for the purification and decolorization of all naturally colored oils and fats or fatty acids, other than mineral oils. Particularly favorable results have been attained in the decolorizing of vegetable or animal oils and fats, which for example are naturally colored red, green or orange, based for example on chlorophyl, lipochrome or the like. The process can also be used in cases where it is a question of the treatment and decolorizing of fats and oils which show marked fatty acid contents. Even with fatty acid alone a good decolorization has been attained.

The process according to the invention is carried out for example as follows:

1000 grams of Congo palm oil which has been dried and freed from mechanical impurities in known manner, and which contains for example from 12-80% of free fatty acids, is cooled to the vicinity of the melting point, which varies according to the fatty acid content. 4 grams of manganese dioxide are then added with stirring. After a short stirring, the commencement of the reaction is to be observed by a green coloring of the mass. The stirring is continued until further change of color is no longer noticeable. 2 grams of sulphuric acid of 66° Bé. are then added at the same temperature and with further stirring. After a short period of stirring, the commencement of the further reaction is observed by a change in the color of the mass. The stirring is continued until this changing of the color of the mass ceases. The mass is then gradually heated up to about 90° C. and mixed with about 30 to 40 grams of fuller's earth residues, natural fuller's earth or the like, after which it is stirred for a short time and finally filtered. The product obtained has a light brown color and is already directly utilisable for many purposes. If complete clarity is desired, the product can in known manner be subjected once or twice to treatment with activated fuller's earth, using at each treatment about 20 grams of the earth. The product so treated has the color of refined peanut oil, and after neutralisation there is obtained a white edible or olive oil, as also a white soap stock, which even after long standing, or after the making of the soap, does not darken, whilst furthermore by this treatment the unpleasant smelling substances are removed.

What I claim as my invention and desire to secure by Letters Patent of the United States is:

1. Process for purifying and decolorizing oily and fatty materials of animal or vegetable origin and containing albuminous coloring matter comprising drying the material, adding to the material from 0.1 to 0.5% of a finely divided solid reagent selected from the group consisting of nickel, cobalt, zinc, manganese, copper; an oxide, dioxide, manganate, permanganate, bichromate and chlorate of cobalt, copper, manganese and nickel, mixing said reagent with said material until a true suspension is obtained, the quantity of reagent added being so small that substantially no increase of fatty acid or oxy-acid occurs, maintaining the temperature of the material substantially at its melting point, continuing the mixing of the material and added reagent until the reagent forms with the mucins, albuminoids and coloring matter of the material a colloidal complex, during the formation of which a change of color occurs, adding to and stirring into the mixture, when the change of color has ceased, a small quantity of mineral acid while maintaining the temperature of the material in the vicinity of its melting point, heating the mixture to a temperature in the vicinity of 90° C., adding and admixing a quantity of pulverulent adsorbent material, and filtering the mixture to remove the adsorbent material and substances collected thereby, whereby the coloring of the oily and fatty material is considerably reduced, the material being maintained under vacuum during the process.

2. Process for purifying and decolorizing oily and fatty materials of animal or vegetable origin and containing albuminous coloring matter comprising drying the material, adding to the material from 0.1 to 0.5% of finely divided metallic nickel, mixing the nickel with said material until a true suspension is obtained, the quantity of nickel added being so small that substantially no increase of fatty acid or oxy-acid occurs, maintaining the temperature of the material substantially at its melting point, continuing the mixing of the material and added nickel until the nickel forms with the mucins, albuminoids and coloring matter of the material a colloidal complex, during the formation of which a change of color occurs, adding to and stirring into the mixture, when the change of color has ceased, a small quantity of mineral acid while maintaining the temperature of the material in the vicinity of its melting point, heating the mixture to a temperature in the vicinity of 90° C., adding and admixing a quantity of pulverulent adsorbent material, and filtering the mixture to remove the adsorbent material and substances collected thereby, whereby the coloring of the oily and fatty material is considerably reduced.

3. Process for purifying and decolorizing oily and fatty materials of animal or vegetable origin and containing albuminous coloring matter comprising drying the material, adding to the material from 0.1 to 0.5% of finely divided metallic cobalt, mixing the cobalt with said material until a true suspension is obtained, the quantity of cobalt added being so small that substantially no increase of fatty acid or oxy-acid occurs, maintaining the temperature of the material substantially at its melting point, continuing the mixing of the material and added cobalt until the cobalt forms with the mucins, albuminoids and coloring matter of the material a colloidal complex, during the formation of which a change of color occurs, adding to and stirring into the mixture, when the change of color has ceased, a small quantity of mineral acid while maintaining the temperature of the material in the vicinity of its melting point, heating the mixture to a temperature in the vicinity of 90° C., adding and admixing a quantity of pulverulent adsorbent material, and filtering the mixture to remove the adsorbent material and substances collected thereby, whereby the coloring of the oily and fatty material is considerably reduced.

4. Process for purifying and decolorizing oily and fatty materials of animal or vegetable origin and containing albuminous coloring matter comprising drying the material, adding to the material about 0.4% of finely divided, solid manganese dioxide, mixing the manganese dioxide with the material until a true suspension is obtained, the quantity of manganese dioxide added being so small that substantially no increase of fatty acid or oxy-acid occurs, stirring the material and manganese dioxide until the latter forms colloidal complexes with the mucins, albuminoids and coloring matter during the formation of which a change of color occurs, adding to and stirring into the mixture about 0.2% of sulfuric acid of about 66° Bé., continuing the stirring until a further color change takes place, heating the material to about 90° C., adding about 3 to 4% of fuller's earth, and then removing said earth and complexes from the material.

5. Process according to claim 1 and then admixing a quantity of activated fuller's earth approximating but not exceeding 2% of the quantity of material being treated.

6. Process according to claim 1, in which the material is freed of solid impurities before the addition of the reagent.

7. Process according to claim 1 and in which the quantity of acid employed is from 0.1 to 0.2% on the basis of the weight of the material treated.

8. Process according to claim 1 and in which the acid is added gradually and with constant admixing, and the stirring of the mixture after the admixture of the acid being continued for from 1 to 4 hours.

9. Process according to claim 1 and then admixing a quantity of activated bleaching earth with the material at a temperature of about 90° C. and then removing the said earth.

10. Process according to claim 1 and then admixing a quantity of mixed activated earth and activated animal charcoal with the material at a temperature of about 90° C.

11. Process according to claim 1 in which the quantity of adsorbent material is approximately 1 to 2% on the basis of the weight of the material being treated.

12. Process according to claim 1 in which the adsorbent material is fuller's earth residues.

EUGENE KELLENS.